(12) United States Patent
Yun et al.

(10) Patent No.: US 8,279,362 B2
(45) Date of Patent: Oct. 2, 2012

(54) LIQUID CRYSTAL LENS PANEL, METHOD OF MANUFACTURING THE SAME AND DISPLAY DEVICE HAVING THE LIQUID CRYSTAL LENS PANEL

(75) Inventors: Hae-Young Yun, Suwon-si (KR); Hee-Seop Kim, Hwaseong-si (KR); Kyung-Ho Jung, Seoul (KR); Seung-Hoon Lee, Hwaseong-si (KR); Hwi Kim, Seoul (KR); Jung-Hwan Yi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 261 days.

(21) Appl. No.: 12/650,854

(22) Filed: Dec. 31, 2009

(65) Prior Publication Data

US 2011/0032438 A1 Feb. 10, 2011

(30) Foreign Application Priority Data

Aug. 5, 2009 (KR) .................. 10-2009-0071883

(51) Int. Cl.
*G02F 1/1335* (2006.01)

(52) U.S. Cl. .................................................. 349/15

(58) Field of Classification Search .................. 349/15
See application file for complete search history.

(56) References Cited

U.S. PATENT DOCUMENTS

| | | | |
|---|---|---|---|
| 6,628,355 B1 * | 9/2003 | Takahara | 349/106 |
| 2007/0109489 A1 * | 5/2007 | Nomura et al. | 349/200 |
| 2009/0073559 A1 * | 3/2009 | Woodgate et al. | 359/465 |
| 2009/0322862 A1 * | 12/2009 | Marie Vissenberg et al. | 348/59 |
| 2010/0245743 A1 * | 9/2010 | Yokoyama | 349/117 |

* cited by examiner

*Primary Examiner* — Timothy L Rude
(74) *Attorney, Agent, or Firm* — Cantor Colburn LLP

(57) ABSTRACT

A liquid crystal lens panel includes a first substrate, a second substrate, a liquid crystal layer and a light-blocking member. The first substrate includes a plurality of individual electrodes. The individual electrode receives a voltage to have a light path length distribution of a Fresnel lens shape. The second substrate includes a common electrode opposition the individual electrodes. The liquid crystal layer is disposed between the first and second substrates. The light-blocking member is disposed on an area in correspondence with the individual electrode in which a voltage discontinuously varied is applied thereto. Thus, a liquid crystal lens panel of a Fresnel lens type is realized to decrease a liquid crystal cell gap, so that a process efficiency of the liquid crystal lens panel may be enhanced and a manufacturing cost of the liquid crystal lens panel may be reduced.

20 Claims, 6 Drawing Sheets

<2D DISPLAY MODE>

<3D DISPLAY MODE>

LIQUID CRYSTAL LENS PANEL, METHOD OF MANUFACTURING THE SAME AND DISPLAY DEVICE HAVING THE LIQUID CRYSTAL LENS PANEL

This application claims priority to Korean Patent Application No. 2009-0071883, filed on Aug. 5, 2009, and all the benefits accruing therefrom under 35 U.S.C. §119, the content of which in its entirety is herein incorporated by reference.

BACKGROUND OF THE INVENTION

1. Field of the Invention

Exemplary embodiments of the present invention relate to a liquid crystal lens panel, a method of manufacturing the liquid crystal lens panel and a display device having the liquid crystal lens panel. More particularly, exemplary embodiments of the present invention relate to a liquid crystal lens panel having a substantially improved lens aberration, a method of manufacturing the liquid crystal lens panel and a display device having the liquid crystal lens panel.

2. Description of the Related Art

Generally, a display device displays a two-dimensional ("2D") image. Recently, however, a stereoscopic image display apparatus, which displays a three-dimensional ("3D") stereoscopic image, has been developed due to increasing demand for display of 3D stereoscopic images in games and movies, for example. The stereoscopic image display apparatus typically displays 2D flat images, which are different from each other, to a user's eyes, such that the user perceives the displayed different 2D flat images as a 3D stereoscopic image. More specifically, for example, a user may view a pair of different 2D flat images corresponding to each of the user's eyes, and the user's brain synthesizes the pair of different 2D flat images such that the user perceives a 3D stereoscopic image.

A stereoscopic image display device may be classified into either a stereoscopic type display device or an auto stereoscopic type display device, depending upon whether the user wears a device, such as a pair of glasses, in order to perceive the 3D stereoscopic image. Generally, a stereoscopic image display device, which includes a type of stereoscopic such as a barrier type or a lenticular type, for example, has been used in a flat display device. More specifically, in the lenticular type, lights passing a left pixel and a right pixel are refracted by a lenticular lens, which is convex on both sides, so that a stereoscopic image is displayed. In addition, in the lenticular type, most of the light is transmitted through the lenticular lens, and a decrease of luminance is thereby minimized, as compared to a decrease of luminance in the barrier type device.

Typically, a convex lens or a Fresnel lens is used for the lenticular type device. The Fresnel lens has a thinner thickness than the thickness of the convex lens. In addition, the Fresnel lens has a plurality of inclined portions formed on a surface of the lens, and a plurality of valley portions formed between the inclined portions. Thus, the Fresnel lens refracts lights at the inclined portions to condense the lights in one area.

In a display device which displays both a 2D image and a 3D stereoscopic image, a liquid crystal lens is typically used as the convex lens for displaying the 3D stereoscopic image. To display the 3D stereoscopic image, the liquid crystal lens panel controls a liquid crystal arrangement, thereby refracting lights to perform a role of the convex lens.

BRIEF SUMMARY OF THE INVENTION

Exemplary embodiments of the present invention provide a liquid crystal lens panel having, among other things, a substantially improved lens aberration thereof.

Exemplary embodiments of the present invention also provide a method of manufacturing the liquid crystal lens panel.

Exemplary embodiments of the present invention also provide a display device having the liquid crystal lens panel.

According to one or more exemplary embodiments of the present invention, a liquid crystal lens panel includes a first substrate, a second substrate, a liquid crystal layer and a light-blocking member. The first substrate includes a plurality of individual electrodes. The individual electrode receives a voltage to have a light path length distribution of a Fresnel lens shape. The second substrate includes a common electrode opposing the individual electrodes. The liquid crystal layer is disposed between the first and second substrates. The light-blocking member is disposed on an area in correspondence with the individual electrode in which a voltage discontinuously varied is applied thereto.

According to additional exemplary embodiments of the present invention, there is provided a method of manufacturing a liquid crystal lens panel. In the method, a first substrate including a plurality of individual electrodes is formed. The individual electrode receives a voltage to have a light path length distribution of a Fresnel lens shape. A second substrate, which includes a common electrode opposing the individual electrodes, is formed. A liquid crystal layer is formed between the first and second substrates. A light-blocking member is formed, which is disposed in correspondence with the individual electrode in which a voltage discontinuously varied is applied thereto.

According to at other additional exemplary embodiments of the present invention, a display device includes a light source, a display panel and a liquid crystal lens panel. The light source emits light. The display panel displays an image by using the light to include a plurality of pixels. The liquid crystal lens panel includes a plurality of individual electrodes and a light-blocking member. The individual electrodes receive a voltage to have a light path length distribution of a Fresnel lens shape. The light-blocking member is disposed in correspondence with the individual electrode in which a voltage discontinuously varied is applied thereto.

Thus, in exemplary embodiments of the present invention, a liquid crystal lens panel has a Fresnel lens type, thereby substantially decreasing a liquid crystal cell gap. As a result, a manufacturing efficiency of the liquid crystal lens panel is greatly enhanced and a manufacturing cost of the liquid crystal lens panel is thereby significantly reduced. Additionally, a light-blocking member is disposed in an area corresponding to an electrode which receives a discontinuously varying voltage (of voltages applied to the liquid crystal lens panel), and a lens aberration of the liquid crystal lens panel is thereby substantially improved.

BRIEF DESCRIPTION OF THE DRAWINGS

The above and other aspects and features of the present invention will become more readily apparent by describing in further detail exemplary embodiments thereof with reference to the accompanying drawings, in which.

DETAILED DESCRIPTION OF THE INVENTION

Figure 1:
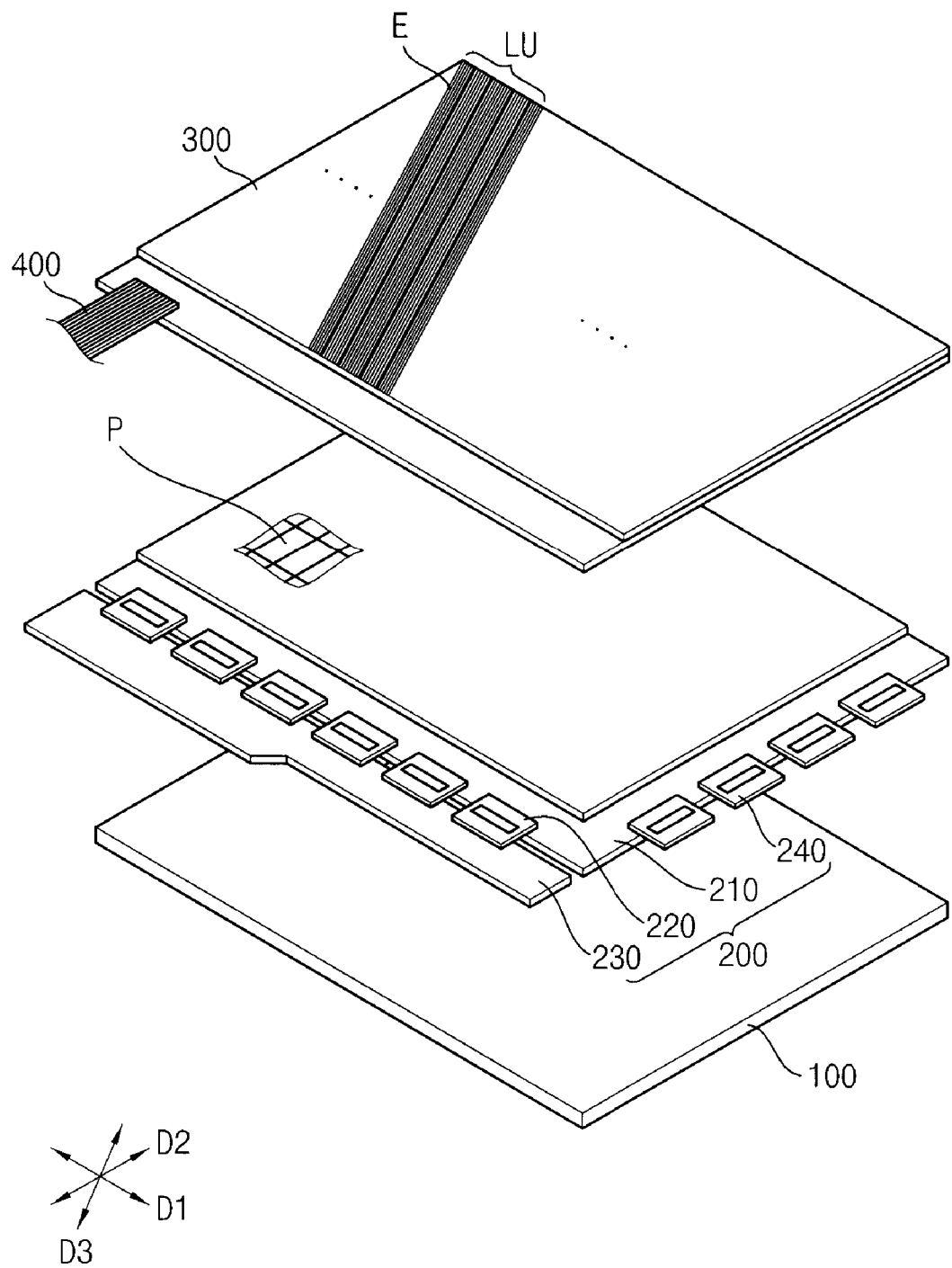
FIG. 1 is a exploded perspective view of an exemplary embodiment of a display device according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

FIG. 1 is an exploded perspective view of an exemplary embodiment of a display device according to the present invention.

Referring to FIG. 1, a display device according to one or more exemplary embodiments includes a light source module 100, a display module 200, a liquid crystal lens panel 300 and a flexible printed circuit board ("FPCB") 400.

The light source module 100 provides the display module 200 with light. The light source module 100 includes a light source (not shown) which emits light. The light source module 100 may include, for example, a fluorescent lamp and/or a light emitting diode, but alternative exemplary embodiments are not limited thereto. In addition, the light source module 100 may be a direct-illumination type light source or, alternatively, an edge-illumination type light source, based on a position of the light source in the display device. When the light source module 100 is an edge-illumination type light source, the light source module 100 may further include a light guide plate (not shown).

The display module 200 includes a display panel 210, a data circuit part 220, a source printed circuit board ("PCB") 230 and a gate circuit part 240. The display panel 210 includes two long sides, e.g., two longitudinal sides, aligned substantially in parallel to each other along a first direction D1 and two short sides, e.g., two latitudinal or transverse sides, aligned substantially in parallel with each other along a second direction D2, which is substantially perpendicular to, e.g., crossing, the first direction D1, as shown in FIG. 1. A third direction D3, discussed below, is substantially perpendicular to both the first direction D1 and the second direction D2 (put another way, the first direction D1, the second direction D2 and the third direction D3 are mutually orthogonal.) The display panel 210 includes a plurality of pixels P. Each pixel P of the plurality of pixels P may include two short sides aligned substantially in parallel with the first direction D1 and two long sides aligned in parallel with the second direction D2, which crosses the first direction D1.

The data circuit part 220 applies a data voltage to each of the pixels P. The data circuit part 220 is electrically connected to the source PCB 230. The gate circuit part 240 provides each pixel P with a gate signal for controlling a charging timing of the data voltage. In an exemplary embodiment, for example, the gate circuit part 240 may be disposed on, e.g., mounted on, the display panel 210 in a chip type configuration. Alternatively, the gate circuit part 240 may be integrated into the display panel 210 by a manufacturing process for a thin-film transistor ("TFT") included in the display panel 210, but alternative exemplary embodiments are not limited thereto.

The liquid crystal lens panel 300 includes a plurality of lens units LU.

Each lens unit LU of the plurality of lens units LU includes a plurality of individual electrodes E, a plurality of light-blocking members SP (FIGS. 2 and 3) aligned substantially in parallel with individual electrodes E of the plurality of individual electrodes E, a common electrode CE (FIG. 4A) disposed opposite the individual electrodes E and a liquid crystal layer 390 (FIG. 4A) disposed between the individual electrodes E and the common electrode CE.

The individual electrodes E extend along the third direction D3 crossing the first direction D1 and the second direction D2. When each of the lens units LU of the plurality of lens units LU are implemented as a Fresnel lens (e.g., a thin, light lens having concentric annular sections (e.g., Fresnel zones) and a large aperture and short focal length), the third direction D3 may be a direction of a lens axis of the Fresnel lens unit LU. In one or more exemplary embodiments, first voltages, e.g., continuously varying voltages, and second voltages, e.g., discontinuously varying voltages, are applied to the individual electrodes E, as will be described in further detail below with references to FIGS. 2 through 4B.

Each of the light-blocking members SP is disposed in an area (hereinafter referred to as "discontinuity area") corresponding to the individual electrodes E to which the second voltages, e.g., the discontinuously varying voltages, are applied. The discontinuity area may include an entire area corresponding to the individual electrode E to which the second, discontinuously varying, voltage is applied. Alternatively, the discontinuity area may include only a portion of the area corresponding to the individual electrode E to which the second, discontinuously varying, voltage is applied.

When a voltage, e.g., the first voltage, is applied to the individual electrodes E and the common electrode CE, liquid crystal molecules 395 of the liquid crystal layer 390 (FIG. 4A) are arranged to have a light path length corresponding to that of a Fresnel lens. More specifically, an area corresponding to the individual electrodes E to which the first, continuously varying, voltages are applied corresponds to an inclined portion of the Fresnel lens, and an area corresponding to the individual electrodes E to which the second, discontinuously varying, voltages are applied corresponds to a valley portion of the Fresnel lens, as will be described in greater detail below with reference to FIG. 4B. Thus, in one or more exemplary embodiments the lens unit LU is driven as a Fresnel lens.

In the discontinuity area, control of liquid crystal may be unstable, and aberrations may therefore be generated in the discontinuity area due to a light leakage associated therewith. Thus, the light-blocking member SP is disposed proximate to, e.g., above, the discontinuity area, and the light leakage is thereby substantially reduced and/or is effectively prevented, and aberrations are thereby substantially decreased in the display device according to one or more exemplary embodiments.

The liquid crystal lens panel 300 may be driven in both a two-dimensional mode, as well as a three-dimensional mode. Specifically, for example, when the display device according to an exemplary embodiment displays a two-dimensional image, the voltages described above (e.g., the first voltage and/or the second voltage) are not applied to the liquid crystal lens panel 300. Instead, the liquid crystal lens panel 300 receives a third voltage to display the two-dimensional image. More specifically, based on the third voltage, the liquid crystal lens panel 300 transmits light provided from the display panel 210 without refraction (e.g., the liquid crystal lens panel 300 is not operated as a Fresnel lens), and a viewer thereby views the two-dimensional image. On the other hand, when the display device according to an exemplary embodiment displays a three-dimensional image, a driving voltage, including, for example, the first voltage and the second voltage, is applied to the liquid crystal lens panel 300. The liquid crystal lens panel 300 is thereby operated as the Fresnel lens to refract light provided from the display panel 210, and a viewer thereby views the three-dimensional image.

In one or more exemplary embodiments, the FPCB 400 is electrically connected to the liquid crystal lens panel 300 to deliver a voltage, such as the voltages discussed above, but not being limited thereto, to the liquid crystal lens panel 300.

Figure 2:
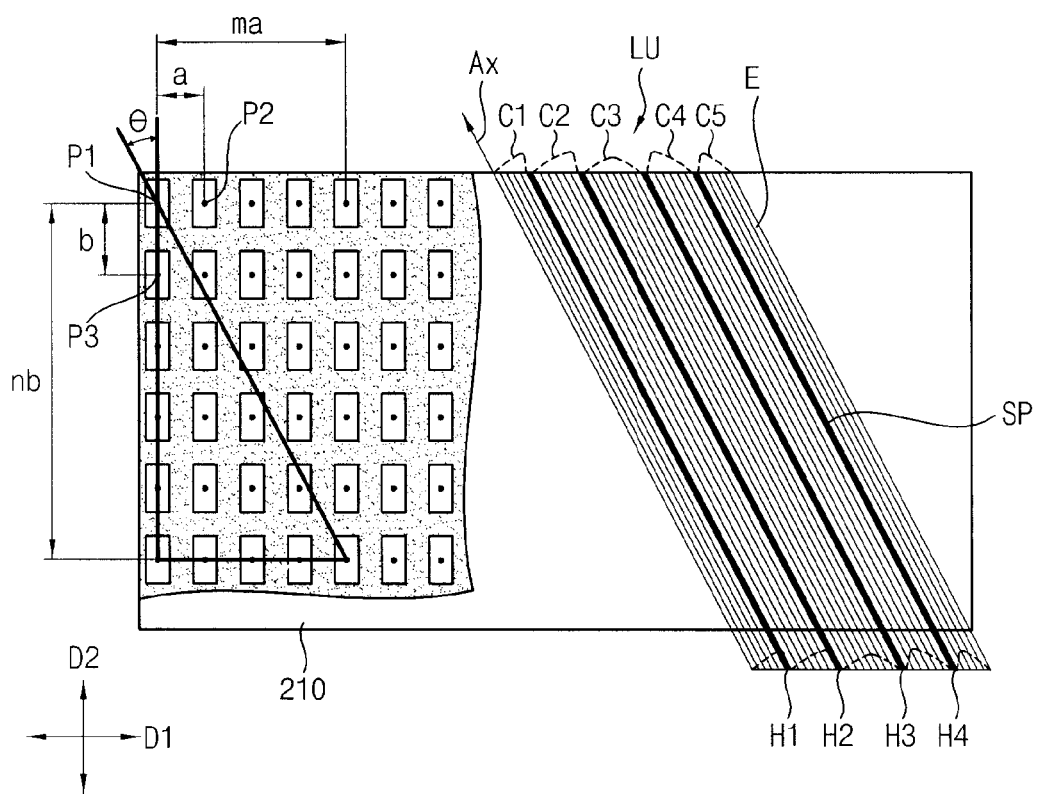
FIG. 2 is a plan view of a display panel of the display device of FIG. 1.

FIG. 2 is a plan view of the display panel 210 of the display device of FIG. 1.

Referring to FIGS. 1 and 2, the display panel 210 includes two long sides aligned substantially in parallel with the first direction D1 and two short sides aligned substantially in parallel with the second direction D2. The display panel 210 includes the plurality of pixels P, the pixels P thereof being arranged in a substantially matrix pattern, as shown in FIG. 2. Specifically, a first pixel P1 and a second pixel P2 are arranged in a pixel row along the first direction D1, and the first pixel P1 and a third pixel P3 are arranged in a pixel column along the second direction D2. The first pixel P1 and the second pixel P2 arranged along the first direction D1 are arranged based on a first repeat period 'a,' while the first pixel P1 and the third pixel P3 arranged along the second direction D2 are arranged based on a second repeat period 'b.' In one or more exemplary embodiments, the first repeat period 'a' is defined as a distance between a center portion of the first pixel P1 and a center portion of the second pixel P2, and the second repeat period 'b' is defined as a distance between a center portion of the first pixel P1 and a center portion of the third pixel P3, as illustrated in FIG. 2.

As discussed above, the liquid crystal lens panel 300 includes the plurality of lens units LU. Each of the lens units LU includes a plurality of the individual electrodes E and a plurality of the light-blocking members SP.

Figure 3:
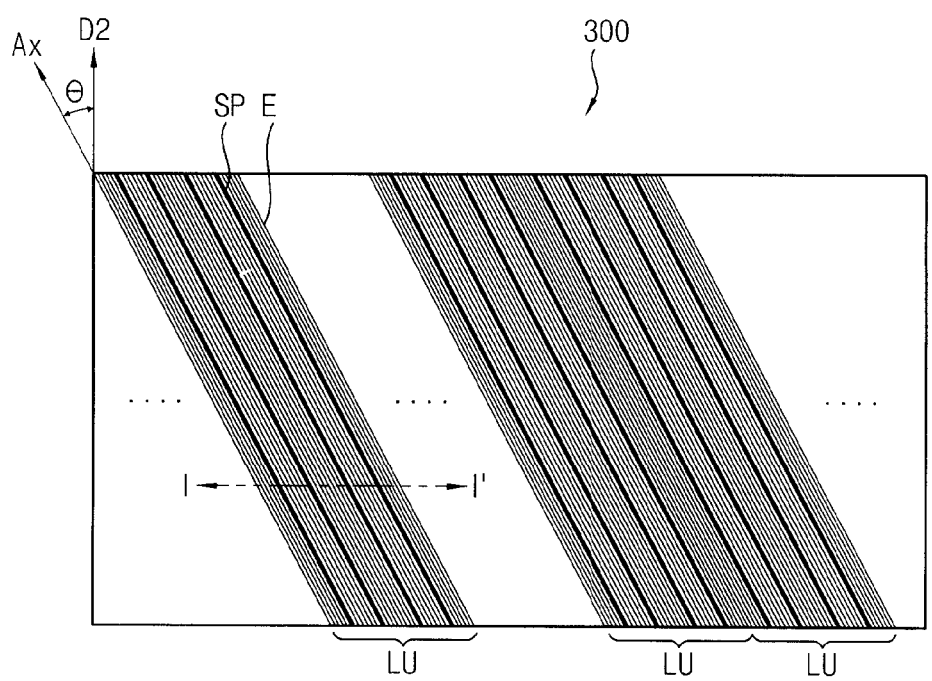
FIG. 3 is a plan view of a liquid crystal lens panel of the display device of FIG. 1.

The lens unit LU has a lens axis Ax (FIGS. 2 and 3). The lens axis Ax extends along a slope having an inclined angle θ defined with respect to the second direction D2. The lens unit LU extends along the lens axis Ax on the display panel 210. Thus, the lens units LU of the liquid crystal lens panel 300 are disposed on the display panel 210 substantially in parallel with each other along the lens axis Ax, as shown in FIG. 2.

The individual electrodes E and the light-blocking members SP are disposed substantially in parallel with the lens axis Ax. When a voltage, such as the first voltage and/or the second voltage, is applied to the individual electrodes E, the lens unit LU is operated as a Fresnel lens having a light path length corresponding to a plurality of inclined portions C1, C2, C3, C4 and C5 and a plurality of valley portions H1, H2, H3 and H4 positioned at boundary between the inclined portions (see also FIG. 4B, described in greater detail below). The light-blocking members SP are disposed at discontinuity areas corresponding to the valley portions C1, C2, C3, C4 and C5.

The inclined angle θ of the lens axis Ax is defined by Equation 1, below, taken in conjunction with the pixel P structure of the display panel 210 according to the exemplary embodiment shown in FIG. 2.

$$\tan(\theta) = \frac{(ma)}{(nb)} \qquad \text{(Equation 1)}$$

In Equation 1, 'm' and 'n' are natural numbers, 'a' is the first repeat period of the pixels P that are repeated, e.g., are arranged alternately, along the first direction D1, and 'b' is the second repeat period of the pixels P that are repeated, e.g., are arranged alternately, along the second direction D2.

In exemplary embodiments, for example, 'm/n' may be 0, 1 or, alternatively, ½, but additional exemplary embodiments are not limited thereto. The lens axis Ax may be substantially in parallel with the second direction D2. Alternatively, the lens axis Ax may have a slope corresponding to the inclined angle θ. The individual electrode E and the light-blocking member SP may be formed along substantially the same inclined angle θ of the lens axis Ax.

Figure 4A:
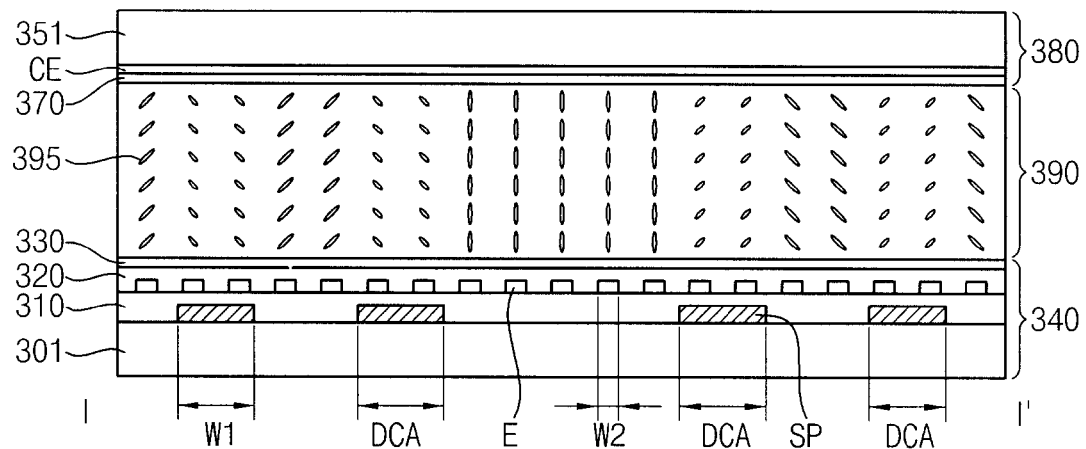
FIG. 4A is a partial cross-sectional view taken along line I-I' of FIG. 3.
Figure 4B:
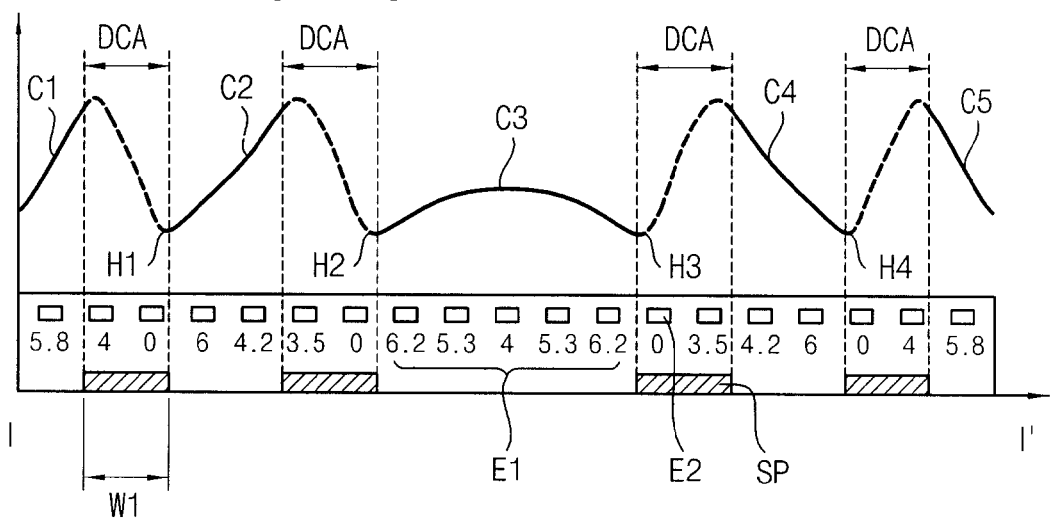
FIG. 4B is a graph of light path lengths versus position along the line I-I' of FIG. 3 showing a light path length distribution of the liquid crystal lens panel of FIG. 3.

FIG. 3 is a plan view of liquid crystal lens panel 300 of the display device of FIG. 1. FIG. 4A is a partial cross-sectional view taken along line I-I' of FIG. 3, and FIG. 4B is a graph of light path lengths versus position (along the line I-I' of FIG. 3) showing a light path length distribution of the liquid crystal lens panel 300 of FIG. 3.

Referring to FIGS. 1, 3 and 4A, the liquid crystal lens panel 300 includes the lens units LU. Each of the lens units LU has a lens axis Ax which is inclined with respect to the second direction D2 at the inclined angle θ. Each of the lens units LU is inclined on the display panel 210 to have the inclined angle θ, the lens units LU are arranged substantially in parallel with each other. In one or more exemplary embodiments, the lens axis Ax is inclined at the inclined angle θ. Alternatively, the lens axis Ax may be aligned substantially in parallel with the second direction D2.

In an exemplary embodiment, the liquid crystal lens panel 300 includes a first substrate 340, a second substrate 380 and the liquid crystal layer 390.

The first substrate 340 includes a first base substrate 301, a plurality of the light-blocking members SP, a first insulation layer 310, a plurality of the individual electrodes E, a second insulation layer 320 and a first alignment layer 330.

The light-blocking members SP are disposed on discontinuity areas DCA on the first base substrate 301. As described above, the discontinuity area DCA may be an area corresponding to the individual electrode E to which a discontinuously varying voltage, e.g., the second voltage, is applied. Alternatively, the discontinuity area DCA may be an area corresponding to a position at which a light path length is discontinuously varied. Each of the light-blocking members SP extends along the lens axis Ax direction (FIG. 2) to have a first width W1 (FIG. 4A). First widths W1 of each of the light-blocking members SP may be different from each other. Specifically, the first widths W1 of the light-blocking members SP may differ based on a size of a corresponding discontinuity area DCA, e.g., according to a level of control of liquid crystal therein.

In an exemplary embodiment, the first insulation layer 310 is disposed on the first base substrate 301 having the light-blocking members SP disposed thereon, as shown in FIG. 4A.

The individual electrodes E are disposed on the first insulation layer 310. The individual electrodes E receive voltages (e.g., the first voltages and/or the second voltages) for a three-dimensional display mode, such that the individual electrodes E are operated as a Fresnel lens. Each of the individual electrodes E extends along the lens axis Ax direction to have a second width W2 that is less than the first width W1. In an exemplary embodiment, the first width W1 of the light-blocking member SP may be equal to or greater than about twice the second width W2 of the individual electrode E, but alternative exemplary embodiments are not limited thereto. The first width W1 of the light-blocking member SP may be determined based on a transmittance of the liquid crystal lens panel 300 and a size of the discontinuity area.

The second insulation layer 320 is disposed on the first base substrate 301 on which the individual electrodes E are disposed.

The first alignment layer 330 is disposed on the first base substrate 301 on which the second insulation layer 320 is disposed. The first alignment layer 330 has a first alignment direction, so that an initial alignment of the liquid crystal layer 390 is not twisted, for example, as shown in FIG. 4A.

The second substrate 380 includes a second base substrate 351, the common electrode CE and a second alignment layer 370.

The common electrode CE is disposed on the second base substrate 351.

The second alignment layer 370 is disposed on the second base substrate 351 on which the common electrode CE is disposed. The second alignment layer 370 has a second alignment direction, such that an initial alignment of the liquid crystal layer 390 is not twisted, as shown in FIG. 4A.

The liquid crystal layer 390 includes liquid crystal molecules 395. As shown in portions of FIG. 4A, he liquid crystal molecules 395 may be aligned in an antiparallel alignment structure, e.g., a non-parallel, such as an orthogonal or perpendicular, alignment structure, but are not limited thereto. In additional exemplary embodiments, the liquid crystal molecules 395 (or portions thereof) may be aligned in a vertical alignment structure, for example.

When a voltage is applied to the liquid crystal lens panel 300, the liquid crystal molecules 395 are arranged, e.g., are aligned, to have a light path length distribution of a Fresnel lens.

Referring to FIGS. 4A and 4B, the liquid crystal lens panel 300 has a light path length distribution corresponding to a plurality of the inclined portions C1, C2 and C3. When the light-blocking member SP is not disposed on the liquid crystal lens panel 300, liquid crystal lens panel 300 has a light path length corresponding to valley portions H1, H2, H3 and H4, which correspond to boundaries of the inclined portions C1, C2, C3, C4 and C5. A controlling of the liquid crystal is unstable in the valley portions H1, H2, H3 and H4, and an aberration may be generated in the valley portions H1, H2, H3 and H4, due to light leakage therethrough.

Therefore, in one or more exemplary embodiments, the light-blocking members SP are disposed in the discontinuity areas DCA corresponding to the valley portions H1, H2, H3 and H4. Moreover, each discontinuity area DCA is disposed in an area in which an individual electrode E is positioned, and, while a continuous varying voltage (e.g., the first voltage) is applied to some or all of the individual electrodes E, a discontinuous decreasing voltage (or a discontinuous increasing voltage), e.g., the second voltage) is suddenly applied only to the individual electrodes E that correspond to the valley portions H1, H2, H3 and H4.

Specifically, as shown in FIG. 4B, the individual electrodes E may include a first individual portion E1, e.g., a first individual electrode portion E1, to which the first, continuously varying, voltage is applied, and a second individual electrode E2, e.g., a second individual electrode portion E2, to which the second voltage, e.g., the voltage which is continuously varied and is then discontinuously decreased, e.g., to zero (0) volts (V), is applied. The light-blocking member SP is disposed in an area corresponding to the second individual electrode portion E2 to which the second, discontinuous voltage (e.g., of 0 V) is applied, as shown in FIG. 4B.

The light-blocking member SP is disposed proximate to the discontinuity area DCA in which the controlling of liquid crystal would otherwise be unstable, and light leakage is thereby prevented in the display device according to exemplary embodiments of the present invention. Thus, aberrations are substantially decreased.

More specifically, as the liquid crystal lens panel 300 is driven as a Fresnel lens, a cell gap of the liquid crystal lens panel 300 driving the liquid crystal cell gap as a convex lens, e.g., as the Fresnel lens, may decrease to about 1/K (where 'K' is a natural number corresponding to ½ of a number of inclined portions included in the Fresnel lens). For example, when the Fresnel lens has a symmetric structure along a left-right direction, and a number of inclined portions disposed at a left side and a right side thereof is 'K', a liquid crystal cell gap of the Fresnel lens type is decreased to 1/K less than a liquid crystal cell gap of a display device having a convex lens type.

Thus, when the liquid crystal cell gap is decreased, a manufacturing efficiency of the liquid crystal lens panel 300 according to an exemplary embodiment is substantially enhanced and a manufacturing cost of the liquid crystal lens panel 300 is thereby greatly decreased. Moreover, even though liquid crystals having a low birefringence may use, a focus distance required for displaying a three-dimensional ("3D") stereo image is provided. Furthermore, a response speed of the liquid crystal lens panel 300 is thereby enhanced, and the liquid crystal lens panel 300 may be easily employed as a high speed lens, for example.

Figure 5:
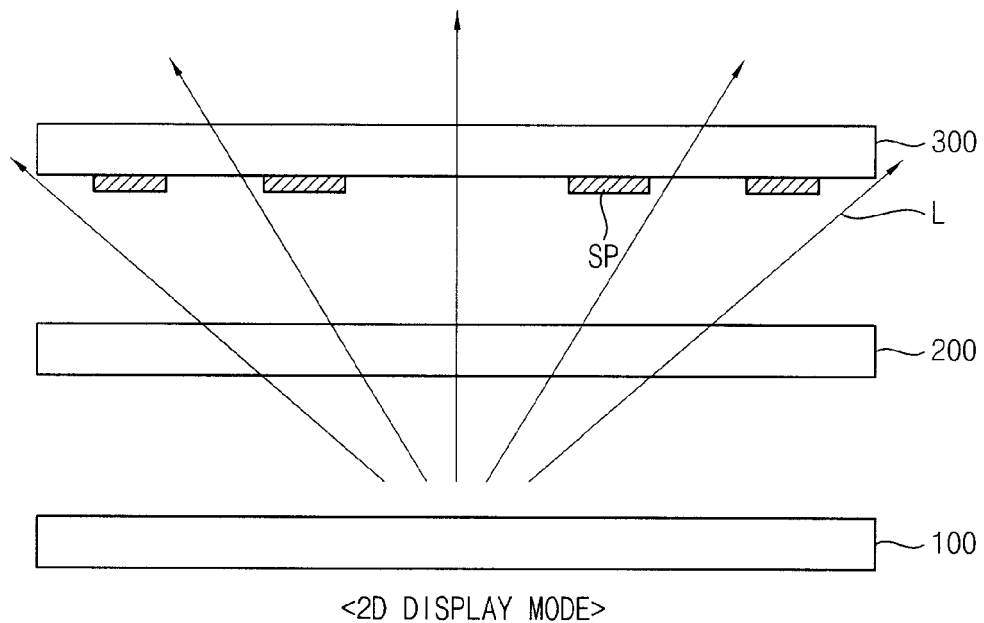
FIG. 5 is an exploded partial cross-sectional view of the display device of FIG. 1 illustrating a two-dimensional image displayed thereon.

FIG. 5 is an exploded partial cross-sectional view of the display device of FIG. 1 illustrating a two-dimensional image displayed thereon.

Referring to FIGS. 1 and 5, the light source module 100 emits lights L.

The lights L emitted from the light source module 100 are provided to the display panel 210 (FIG. 1) of the display module 200. As will be described below, the display panel 210 according to an exemplary embodiment displays a two-dimensional image.

Lights L transmitted through the display panel 210 are provided to the liquid crystal lens panel 300. In this case, the third is provided to the liquid crystal lens panel 300 (e.g., the first voltage and the second voltage are not applied to the liquid crystal lens panel 300). The liquid crystal molecules 395 of the liquid crystal lens panel 300 maintain an initial alignment status, and the light L transmitted through the display panel 210 is transmitted without refraction by the liquid crystal lens panel 300.

Thus, the display device may display a two-dimensional ("2D") image.

Figure 6:
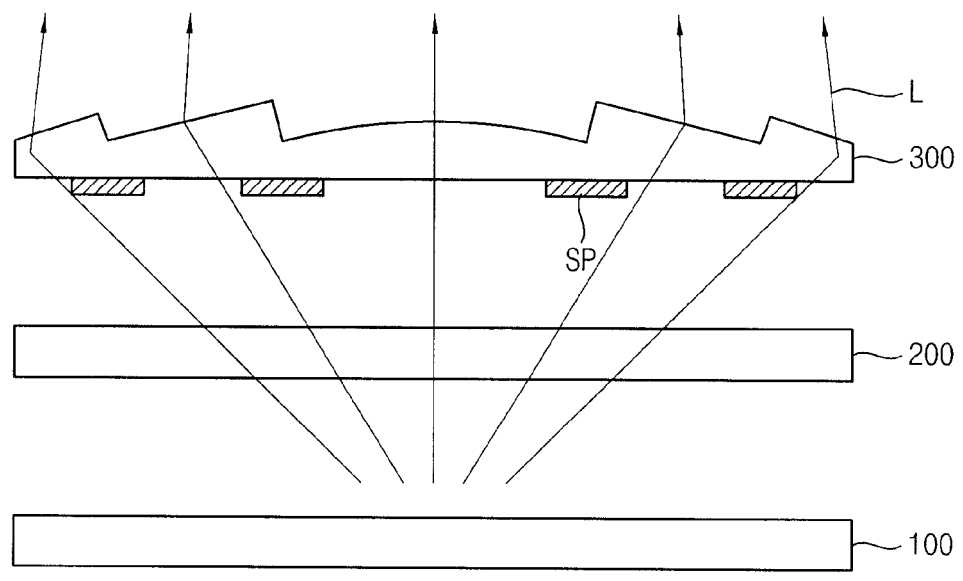
FIG. 6 is an exploded partial cross-sectional view of the display device of FIG. 1 illustrating a three-dimensional image displayed thereon.

FIG. 6 is an exploded partial cross-sectional view of the display device of FIG. 1 illustrating a three-dimensional image displayed thereon.

Referring to FIGS. 1 and 6, the light source module 100 emits lights L.

The lights L emitted from the light source module 100 are provided to the display panel 210. As will be described below, the display panel 210 according to an exemplary embodiment displays a three-dimensional image.

Lights L transmitted through the display panel 210 are provided to the liquid crystal lens panel 300. To display the three-dimensional, a voltage, such as the first voltage, is provided to the liquid crystal lens panel 300. When the first voltage is applied to the liquid crystal lens panel 300, each of the lens units LU are driven as a Fresnel lens. Liquid crystal molecules 395 of the liquid crystal lens panel 300 are rearranged to have a light path length distribution of the Fresnel lens. Lights L transmitted through the display panel 210 are therefore refracted by the liquid crystal lens panel 300.

Thus, the display device displays the three-dimensional image.

The light-blocking members SP are disposed at the discontinuity areas DCA at which a controlling of liquid crystal is unstable, and light leakage is thereby effectively prevented in the discontinuity area DCA. Thus, aberrations generated in the discontinuity area DCA are substantially decreased.

Figure 7A:
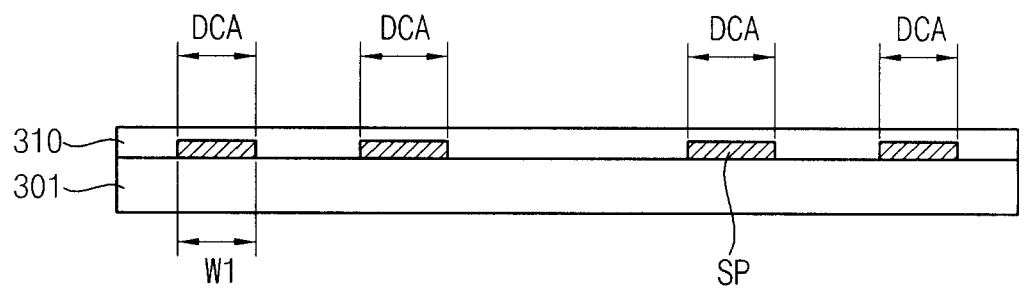
FIGS. 7A through 7C are partial cross-sectional views illustrating an exemplary embodiment of a method of manufacturing a liquid crystal lens panel according to the present invention.
Figure 7B:
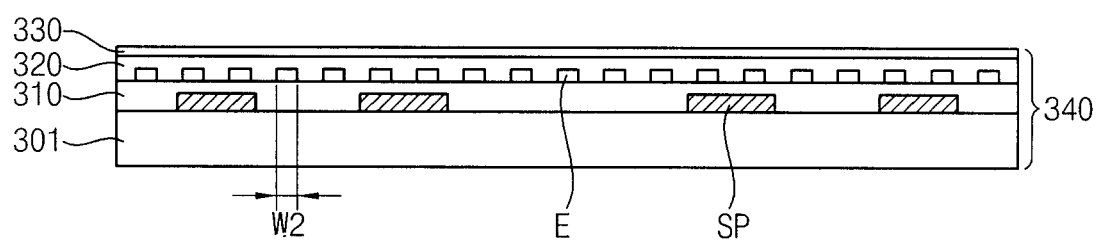
Figure 7C:
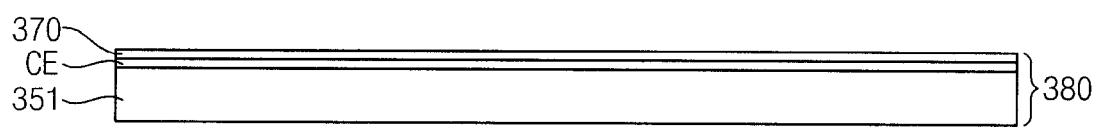

FIGS. 7A through 7C are partial cross-sectional views illustrating an exemplary embodiment of a method of manufacturing a liquid crystal lens panel. For purposes of description herein, an exemplary embodiment of a method of manufacturing a liquid crystal lens panel will hereinafter be described with reference to the partial-cross sectional view of the exemplary embodiment of the liquid crystal lens panel 300 shown in FIGS. 3 and 4A, but it will be understood that additional exemplary embodiments of the method are not limited thereto.

Referring to FIGS. 3, 4A and 7A, an optically non-transparent material is disposed on, e.g., is formed on, a first base substrate 301, and then the non-transparent material is patterned to form a light-blocking member SP on a discontinuity area DCA defined on the first base substrate 301. The light-blocking member SP extends at an angle with respect to the second direction D2 to have an inclined angle θ therewith, and to have a first width W1. The first base substrate 301 may be an organic substrate, e.g., an insulation substrate, but alternative exemplary embodiments are not limited thereto. The non-transparent material may include, for example, an organic material and/or a metallic material. A first insulation layer 310 is formed on the first base substrate 301 on which the light-blocking member SP is formed.

Referring to FIGS. 3, 4A and 7B, a conductive material is formed on the first base substrate 301 on which the first insulation layer 310 is formed, and the conductive material is patterned to form an individual electrode E. In one or more exemplary embodiments, the conductive material may include an optically transparent material, for example. A second insulation layer 320 is formed on the first base substrate 301 on which the individual electrode E is formed. A first alignment layer 330 is formed on the first base substrate 301 on which the second insulation layer 320 is formed. Thus, the first substrate 340 of the liquid crystal lens panel 300 is manufactured.

Referring to FIGS. 3, 4A and 7C, a conductive material is formed on the second base substrate 351 to form a common electrode CE. The second base substrate 351 may be an organic substrate, for example, having insulating property. The second alignment layer 370 is formed on the second base substrate 351 on which the common electrode CE is formed. Thus, the second substrate 380 of the liquid crystal lens panel 300 is formed.

When the first substrate 340 and the second substrate 380 are completed, a sealant (not shown) is formed on at least one of the first substrate 340 and the second substrate 380, and a liquid crystal layer 390 is formed therebetween by a drop process, for example. When the liquid crystal layer 390 is formed, the first substrate 340 and the second substrate 380 are connected, e.g., are coupled with each other, by the sealant. Thus, the liquid crystal layer 390 is sealed in the liquid crystal dropping process. Alternatively, the liquid crystal layer 390 may be sealed by various other processes, such as a liquid crystal injection process, for example.

Figure 8:
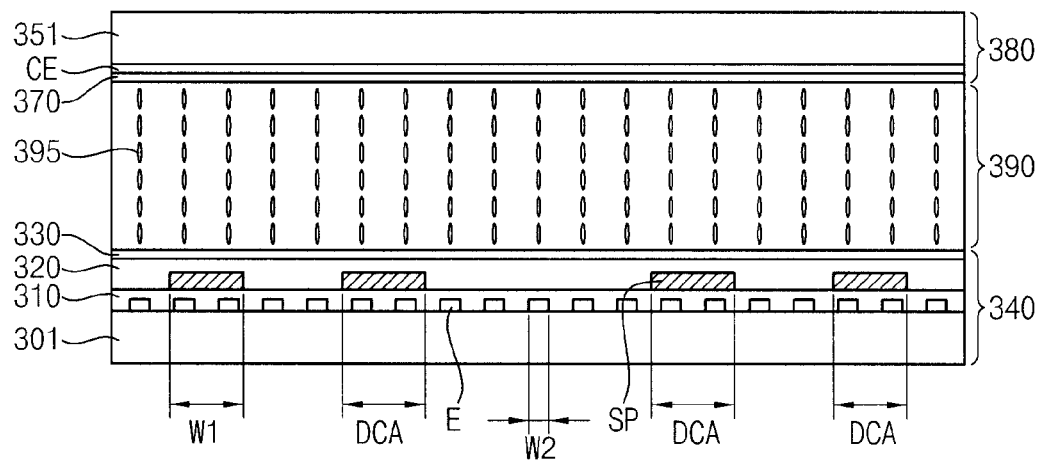
FIG. 8 is a partial cross-sectional view of another exemplary embodiment of a liquid crystal lens panel according to the present invention.

FIG. 8 is a partial cross-sectional view of another exemplary embodiment of a liquid crystal lens panel according to the present invention.

In FIG. 8, the same reference characters identify the same or like components described above with reference to additional exemplary embodiments, and any repetitive detailed description thereof will hereinafter be omitted or simplified.

Referring to FIGS. 3 and 8, the liquid crystal lens panel 300 according to one or more additional exemplary embodiments includes a first substrate 340, a second substrate 380 and a liquid crystal layer 390.

The first substrate 340 includes a first base substrate 301, a plurality of individual electrodes E, a first insulation layer 310, a plurality of light-blocking members SP, a second insulation layer 320 and a first alignment layer 330.

Individual electrodes E of the plurality of individual electrodes E are disposed on the first base substrate 301. The first insulation layer 310 is disposed on the first base substrate 301 in which the individual electrodes E are disposed. Light-blocking members SP of the plurality of light-blocking members SP are disposed on corresponding discontinuity areas DCA of the first insulation layer 310. Each of the light-blocking members SP extends along the lens axis Ax direction and has a first width W1. In an exemplary embodiment, the first width W1 of the light-blocking member SP may be equal to or greater than about twice the second width W2 of the individual electrode E. The first width W1 of the light-blocking member SP may be determined by a transmittance of the liquid crystal lens panel 300.

The second insulation layer 320 is disposed on the first base substrate 301 on which the light-blocking members SP are disposed. The first alignment layer 330 is disposed on the first base substrate 301 on which the second insulation layer 320 is disposed. The first alignment layer 330 has a first alignment direction, and an initial alignment of the liquid crystal layer 390 is therefore not twisted.

The second substrate 380 includes a second base substrate 351, a common electrode CE and a second alignment layer 370. The common electrode CE is disposed on the second base substrate 351. The second alignment layer 370 is disposed on the second base substrate 351 on which the common electrode CE is disposed. The second alignment layer 370 has a second alignment direction, and an initial alignment of the liquid crystal layer 390 is therefore not twisted.

The liquid crystal layer 390 includes liquid crystal molecules 395. The liquid crystal molecules 395 may be aligned in an antiparallel alignment structure, but alternative exemplary embodiments are not limited thereto. Alternatively, for example, the liquid crystal molecules 395 may be aligned in a vertical alignment structure.

Therefore, in an alternative exemplary embodiment, the light-blocking member SP (disposed between the first base substrate 301 and the individual electrodes E in the exemplary embodiment shown in FIG. 4A) is disposed between the individual electrodes E and the liquid crystal layer 390, as shown in FIG. 8.

Hereinafter, an exemplary embodiment of a method of manufacturing the liquid crystal lens panel 300 of FIG. 8 will be described in greater detail with reference to FIGS. 8 and 7A through 7C.

A conductive material is formed on the first base substrate 301, and the conductive material is patterned to form the individual electrodes E. A first insulation layer 310 is formed on the first base substrate 301 on which the individual electrodes E are formed. A non-transparent material is formed on the first base substrate 301 on which the first insulation layer 310 is formed, and the non-transparent material is patterned to form the light-blocking members SP. The second insulation layer 320 is formed on the first base substrate 301 on which the light-blocking members SP are formed. The first alignment layer 330 is formed on the first base substrate 301 on which the second insulation layer 320 is formed to manufacture the first substrate 340.

An exemplary embodiment of a process for forming the second substrate 380 is substantially the same as the exemplary embodiment of the process described in greater detail above with reference to FIG. 7C, and thus a repetitive detailed description thereof has been omitted.

When the first substrate 340 and the second substrate 380 are formed, the liquid crystal layer 390 is interposed between the first substrate 340 and the second substrate 380 using a liquid crystal drop process, for example.

Figure 9:
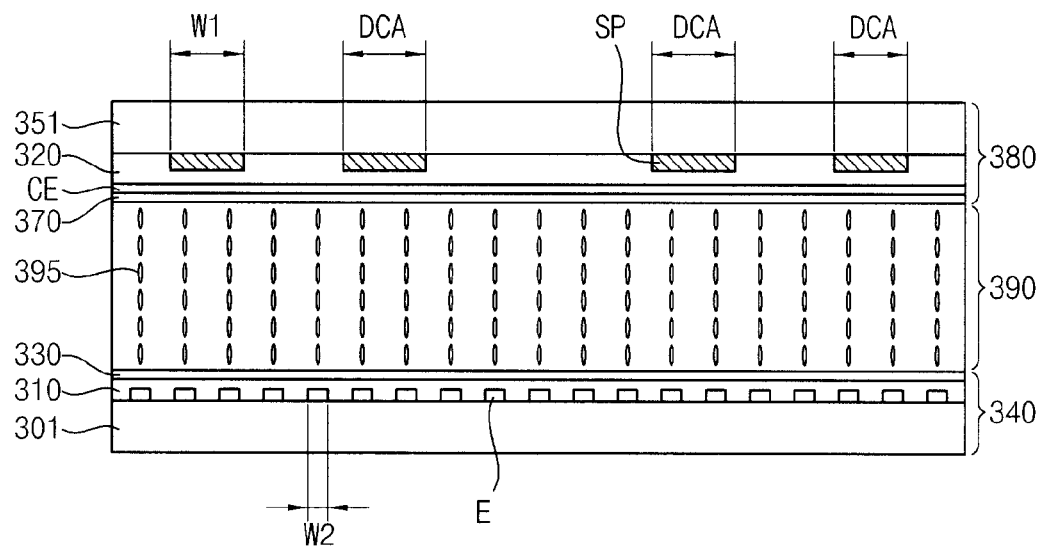
FIG. 9 is a partial cross-sectional view of still another exemplary embodiment of a liquid crystal lens panel according to the present invention.

FIG. 9 is a partial cross-sectional view of still another exemplary embodiment of a liquid crystal lens panel according to the present invention. In FIG. 9, the same reference characters identify the same or like components described above with reference to additional exemplary embodiments, and any repetitive detailed description thereof will hereinafter be omitted or simplified Referring to FIGS. 3 and 9, the liquid crystal lens panel 300 according to one or more additional exemplary embodiments includes a first substrate 340, a second substrate 380 and a liquid crystal layer 390.

The first substrate 340 includes a first base substrate 301, a plurality of individual electrodes E, a first insulation layer 310 and a first alignment layer 330.

Individual electrodes E of the plurality of individual electrodes E are disposed on the first base substrate 301. The first insulation layer 310 is disposed on the first base substrate 301 on which the individual electrodes E are disposed. The first alignment layer 330 is disposed on the first base substrate 301 on which the individual electrodes E are disposed. The first alignment layer 330 has a first alignment direction, so that an initial alignment of the liquid crystal layer 390 is not twisted.

The second substrate 380 includes a second base substrate 351, a plurality of light-blocking members SP, a second insulation layer 320, a common electrode CE and a second alignment layer 370.

Light-blocking members SP of the plurality of light-blocking members SP are disposed on corresponding discontinuity areas DCA on the second base substrate 351. The second insulation layer 320 is disposed on the second base substrate 351 on which the light-blocking members SP are disposed. Each of the light-blocking members SP extends along the lens axis Ax direction and has a first width W1. In one or more exemplary embodiments, the first width W1 of the light-blocking member SP may be greater than about twice the second width W2 of the individual electrode E. The first width W1 of the light-blocking member SP may be determined by a transmittance of the liquid crystal lens panel 300. The common electrode CE is disposed on the second base substrate 351 on which the second insulation layer 320 is disposed. The second alignment layer 370 is disposed on the second base substrate 351 on which the common electrode CE is disposed. The second alignment layer 370 has a second alignment direction, so that an initial alignment of the liquid crystal layer 390 is not twisted.

The liquid crystal layer 390 includes liquid crystal molecules 395. The liquid crystal molecules 395 may be aligned in an antiparallel alignment structure, for example. Alternatively, the liquid crystal molecules 395 may be aligned in a vertical alignment structure.

Thus, in at least one alternative exemplary embodiment, the light-blocking members SP (which are included in the first substrate 340 in the exemplary embodiments shown in FIGS. 4A and 8) are included in the second substrate 380, as shown in the exemplary embodiment illustrated in FIG. 9. Thus, the light-blocking members SP of FIG. 9 are disposed between the second base substrate 351 and the liquid crystal layer 390.

Hereinafter, an exemplary embodiment of a method of manufacturing the liquid crystal lens panel 300 of FIG. 9 will be described in further detail with reference to FIGS. 9 and 7A through 7C.

A conductive material is formed on the first base substrate 301, and the conductive material is patterned to form the individual electrodes E. The first insulation layer 310 is formed on the first base substrate 301 on which the individual electrodes E are formed. The first alignment layer 330 is formed on the first base substrate 301 on which the first insulation layer 310 is formed to complete the first substrate 340.

A non-transparent material is formed on the second base substrate 351, and the non-transparent material is patterned to form the light-blocking members SP. The second insulation layer 320 is formed on the second base substrate 351 on which the light-blocking members SP are formed. A conductive material is formed on the second base substrate 351 on which the second insulation layer 320 is formed to form the common electrode CE. The second alignment layer 370 is formed on the second base substrate 351 on which the common electrode CE is formed to manufacture the second substrate 380.

When the first substrate 340 and the second substrate 380 are formed, the liquid crystal layer 390 is interposed between the first substrate 340 and the second substrate 380 using a liquid crystal drop process, for example.

Thus, according to one or more exemplary embodiments of the present invention as described herein, a liquid crystal lens panel of a Fresnel lens type substantially decreases a liquid crystal cell gap. Thus, a manufacturing efficiency of the liquid crystal lens panel is greatly enhanced and a manufacturing cost of the liquid crystal lens panel is significantly reduced. Additionally, in one or more exemplary embodiments, a light-blocking member is disposed in an area corresponding to an electrode which receives a discontinuously varying voltage (of voltages applied to the liquid crystal lens panel), a lens aberration of the liquid crystal lens panel is thereby substantially improved.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal lens panel comprising:
    a first substrate comprising a plurality of individual electrodes receiving a voltage to have a light path length distribution of a Fresnel lens shape;
    a second substrate comprising a common electrode opposing the individual electrodes;
    a liquid crystal layer disposed between the first and second substrates; and
    a light-blocking member disposed on an area in correspondence with the individual electrode in which a voltage discontinuously varied is applied thereto.

2. The liquid crystal lens panel of claim 1, wherein the first substrate further comprises a first base substrate in which the individual electrodes are disposed thereon, and
    the light-blocking member is disposed between the first base substrate and the individual electrodes.

3. The liquid crystal lens panel of claim 1, wherein the light-blocking member is disposed between the individual electrodes and the liquid crystal layer.

4. The liquid crystal lens panel of claim 1, wherein the second substrate further comprises a second base substrate in which the common electrode is disposed thereon, and
    the light-blocking member is disposed between the second base substrate and the liquid crystal layer.

5. The liquid crystal lens panel of claim 1, wherein the light-blocking member and the individual electrodes are in parallel with each other.

6. The liquid crystal lens panel of claim 1, wherein a width of the light-blocking member is greater than widths of the individual electrodes, respectively.

7. A method of manufacturing a liquid crystal lens panel, the method comprising:
    forming a first substrate comprising a plurality of individual electrodes receiving a voltage to have a light path length distribution of a Fresnel lens shape;
    forming a second substrate comprising a common electrode opposing the individual electrodes;
    forming a liquid crystal layer between the first and second substrates; and
    forming a light-blocking member disposed in correspondence with the individual electrode in which a voltage discontinuously varied is applied thereto.

8. The method of claim 7, wherein forming the first substrate comprises:
    forming the individual electrodes on a first base substrate; and
    forming a first alignment layer on the first base substrate in which the individual electrodes are formed thereon.

9. The method of claim 8, wherein the light-blocking member is formed between the first base substrate and the individual electrodes.

10. The method of claim 8, wherein the light-blocking member is formed between the individual electrodes and the first alignment layer.

11. The method of claim 7, wherein forming the second substrate comprises:
    forming the common electrode on a second substrate; and
    forming a second alignment layer on the second base substrate in which the common electrode is formed thereon, and
    the light-blocking member is formed between the second base substrate and the common electrode.

12. The method of claim 7, wherein the light-blocking member and the individual electrodes are in parallel with each other.

13. The method of claim 7, wherein a width of the light-blocking member is greater than widths of the individual electrodes, respectively.

14. A display device comprising:
    a light source emitting light;
    a display panel displaying an image by using the light to comprise a plurality of pixels; and
    a liquid crystal lens panel comprising:
        a plurality of individual electrodes receiving a voltage to have a light path length distribution of a Fresnel lens shape; and
        a light-blocking member disposed in correspondence with the individual electrode in which a voltage discontinuously varied is applied thereto.

15. The display device of claim 14, wherein the liquid crystal lens panel comprises:
    a first substrate comprising the light blocking member formed on a base substrate and the individual electrodes formed on the light-blocking member;
    a second substrate comprising a common electrode oppositing the individual electrodes; and
    a liquid crystal layer disposed between the first and second substrates.

16. The display device of claim 14, wherein the liquid crystal lens panel comprises:
    a first substrate comprising the individual electrodes formed on a base substrate and the light-blocking member formed on the individual electrodes;
    a second substrate comprising a common electrode oppositing the individual electrodes; and
    a liquid crystal layer disposed between the first and second substrates.

17. The display device of claim 14, wherein the liquid crystal lens panel comprises:
    a first substrate comprising the individual electrodes;
    a second substrate comprising a common electrode oppositing the individual electrodes and the light-blocking member; and
    a liquid crystal layer disposed between the first and second substrates.

18. The display device of claim 14, wherein the light-blocking member and the individual electrodes are in parallel with each other.

19. The display device of claim 18, wherein the liquid crystal lens panel is disposed on the display panel, and
    the light-blocking member is in parallel with a short side of the display panel or is inclined with the short side of the display panel to have an inclined angle.

20. The display device of claim 14, wherein a voltage is applied to the liquid crystal lens panel when a two-dimensional image is displayed on the display panel, and
    the voltage is blocked to the liquid crystal lens panel when a three-dimensional image is displayed on the display panel.

* * * * *